US010486529B2

(12) United States Patent
Sekihara et al.

(10) Patent No.: US 10,486,529 B2
(45) Date of Patent: Nov. 26, 2019

(54) PIPE HOLDER

(71) Applicant: TOYODA GOSEI, CO., LTD., Kiyosu-shi, Aichi-ken (JP)

(72) Inventors: Atsushi Sekihara, Kiyosu (JP); Yoshinari Hiramatsu, Kiyosu (JP); Satoshi Suzuki, Kiyosu (JP)

(73) Assignee: TOYODA GOSEI, CO., LTD., Aichi-pref. (JP)

( * ) Notice: Subject to any disclaimer, the term of this patent is extended or adjusted under 35 U.S.C. 154(b) by 17 days.

(21) Appl. No.: 15/973,641

(22) Filed: May 8, 2018

(65) Prior Publication Data
US 2018/0334026 A1    Nov. 22, 2018

(30) Foreign Application Priority Data

May 22, 2017    (JP) .................................. 2017-100592

(51) Int. Cl.
*B60K 15/04*    (2006.01)
(52) U.S. Cl.
CPC ...... *B60K 15/04* (2013.01); *B60K 2015/0474* (2013.01)
(58) Field of Classification Search
CPC .. B60K 2015/03538; B60K 2015/0474; B60K 2015/03528; B60K 2015/047; F16L 3/12
See application file for complete search history.

(56) References Cited

U.S. PATENT DOCUMENTS

| 8,627,912 | B2* | 1/2014 | Mulanon | B60K 15/03006 |
| | | | | 141/331 |
| 9,150,098 | B2* | 10/2015 | Fujiwara | B60K 15/01 |
| 9,718,349 | B2* | 8/2017 | Kito | B60K 15/04 |
| 9,776,501 | B2* | 10/2017 | Dominic | B60K 15/01 |
| 9,908,405 | B2* | 3/2018 | Kito | B60K 15/05 |
| 10,006,565 | B2* | 6/2018 | Kito | F16L 3/1016 |
| 2017/0021724 | A1* | 1/2017 | Eulitz | B60K 15/01 |

FOREIGN PATENT DOCUMENTS

JP    2010-116999 A    5/2010

* cited by examiner

*Primary Examiner* — Bradley Duckworth
(74) *Attorney, Agent, or Firm* — Posz Law Group, PLC

(57) ABSTRACT

A pipe holder for holding a pipe member at a vehicle body comprises a metallic member including a metallic clamp part that grasps and holds a portion of a fueling pipe to which a protection member is attached, and a metallic fixing part with a metallic engagement pawl part; and a resin clamp that, surrounds and holds the fueling pipe in a peripheral direction with the fueling pipe being grasped by the metallic member. The resin clamp comprises: a first resin member including a first clamp part; and a second resin member including a second clamp part facing the first clamp part and a resin fixing part with a resin engagement pawl part. The metallic engagement pawl part and the resin engagement pawl part are overlaid on each other to form an engagement unit. The engagement unit is engaged with an engagement opening of the vehicle body. When the engagement unit and the engagement opening are in engagement, a vertical lower end of a portion of the metallic engagement pawl part inserted into the engagement opening is located below a lower end of the engagement opening.

6 Claims, 8 Drawing Sheets

PIPE HOLDER

CROSS-REFERENCE TO RELATED APPLICATION

The present application claims priority from Japanese patent application NO. 2017-100592 filed on May 22, 2017, the entirety of the content of which is hereby incorporated by reference into this application.

BACKGROUND

Field

The present disclosure relates to a pipe holder for holding a pipe for introduction of fuel into a fuel tank of a vehicle at a vehicle body.

Related Art

A resin pipe has conventionally been used as a fueling pipe for introduction of fuel into a fuel tank of a vehicle. Japanese Patent Application Publication No. JP 2010-116999 describes a pipe holder for holding a resin pipe at a vehicle body. Such a pipe holder is fastened to the lower surface of the vehicle body with a bolt.

A portion of the resin pipe in a range where fuel is likely to be accumulated may be covered by a protection member for preventing the resin pipe from being damaged by melting in case of fire. A rubber protector is used as such a protection member, for example. To make such a protection member fulfill its function, the protection member is desired to be fixed to a vehicle body while the protection member remains covering the resin pipe even in case of fire. However, applying the pipe holder described in Japanese Patent Application Publication No. JP 2010-116999 brings about the need to fasten the pipe holder to the lower surface of the vehicle body; causing a problem in that a piping shape for a fueling pipe is limited. Hence, there has been a desire for a technique allowing fixing of the protection member to the vehicle body with the resin pipe remaining covered by the protection member even in case of fire while reducing limitation to be imposed on a piping shape for the fueling pipe.

SUMMARY

According to one aspect of the present disclosure, there is provided a pipe holder. The pipe holder is for holding a pipe member at a vehicle body. The pipe member includes a fueling pipe and a protection member, the protection member being attached to the fueling pipe and covering the fueling pipe at least partially. The pipe holder comprises: a metallic member including a metallic clamp part that grasps and holds a portion of the fueling pipe at least partially to which the protection member is attached, and a metallic fixing part formed to be continuous with the metallic clamp part and provided with a metallic engagement pawl part; and a resin clamp that surrounds and holds the fueling pipe in the peripheral direction of the fueling pipe with the fueling pipe being grasped by the metallic member, wherein the resin clamp comprises: a first resin member including a first clamp part located radially outwardly of the fueling pipe from the metallic member and contacting the metallic member; and a second resin member including a second clamp part that faces the first clamp part across the fueling pipe and surrounds the portion of the fueling pipe partially in the peripheral direction to which the protection member is attached, and a resin fixing part formed to be continuous with the second clamp part and provided with a resin engagement pawl part, the metallic engagement pawl part and the resin engagement pawl part are overlaid on each other to form an engagement unit, the engagement unit is inserted into an engagement opening formed at the vehicle body to be engaged with the engagement opening, and when the engagement unit and the engagement opening are in engagement, a vertical lower end of a portion of the metallic engagement pawl part inserted into the engagement opening is located below a lower end of the engagement opening.

DESCRIPTION OF EMBODIMENTS

A. Embodiment

A-1. Configuration of Fuel Supply Device

Figure 1:
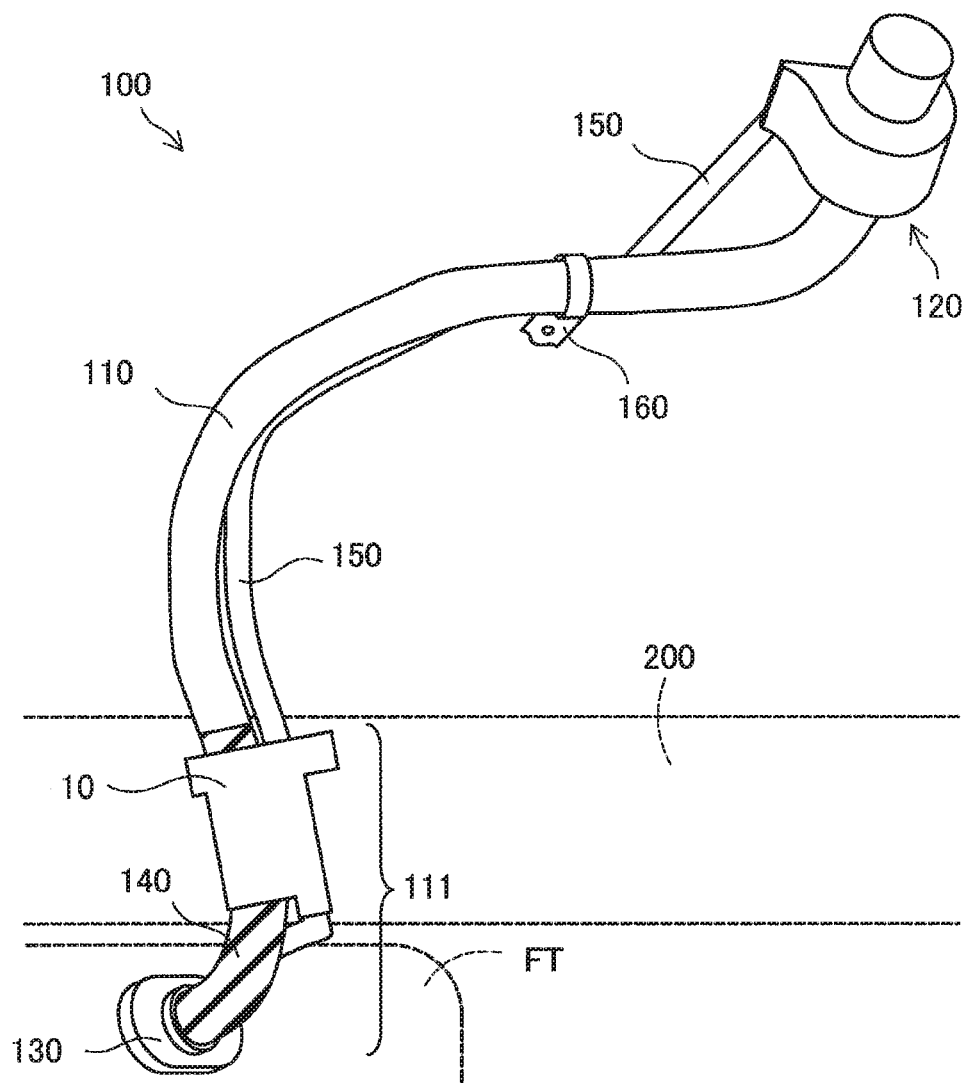
FIG. 1 is a schematic diagram illustrating a fuel supply device using a pipe holder according to one embodiment of the present disclosure.
Figure 2:
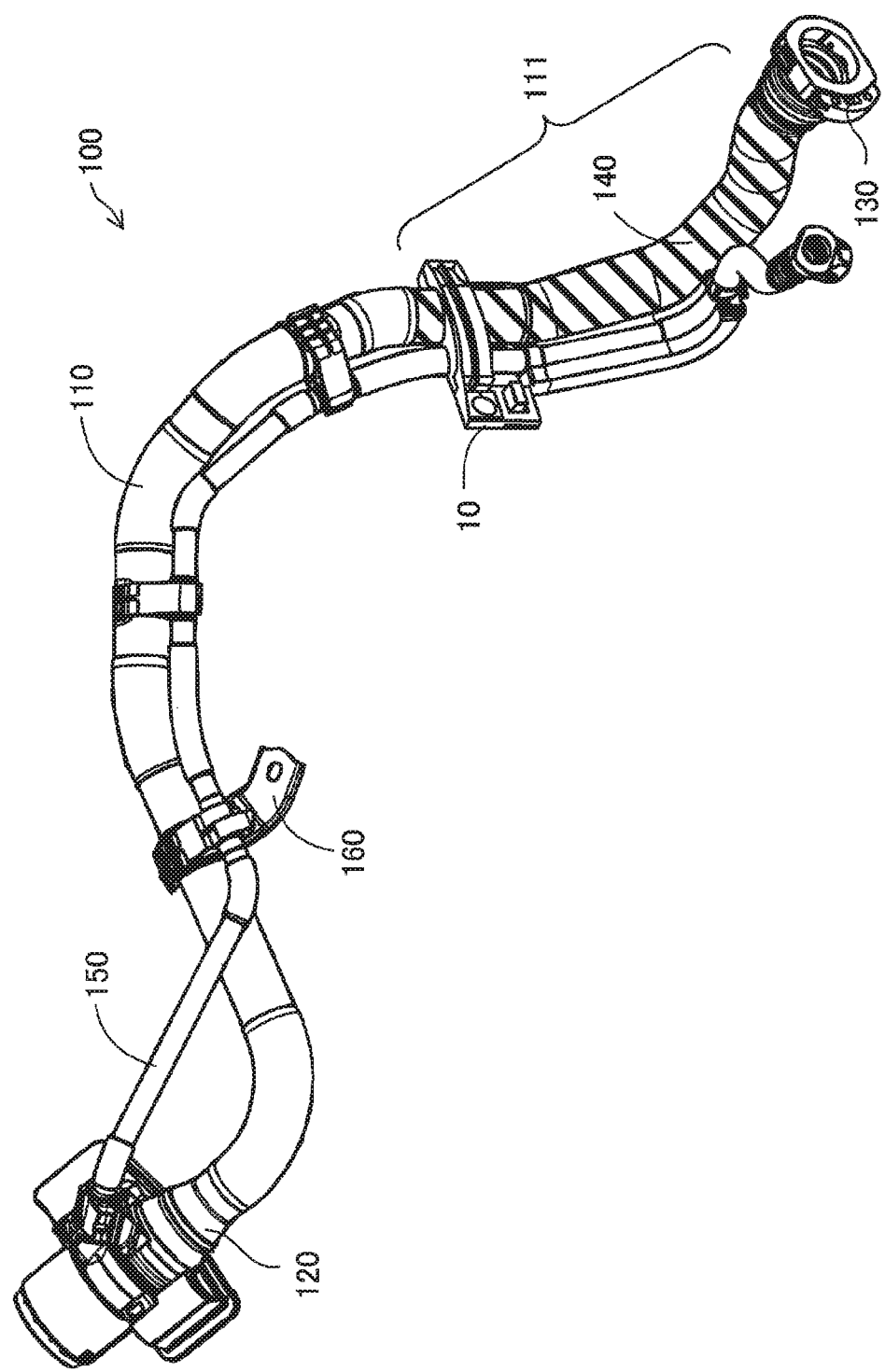
FIG. 2 is a perspective view illustrating the detailed configuration of the fuel supply device using the pipe holder.

FIG. 1 is a schematic diagram illustrating a fuel supply device using a pipe holder according to one embodiment of the present disclosure. FIG. 2 is a perspective view illustrating the detailed configuration of the fuel supply device using the pipe holder. FIG. 2 shows the fuel supply device of FIG. 1 viewed from the back side of the plane of paper. A fuel supply device 100 is mounted on a vehicle and supplies fuel ejected from a fueling gun not shown in the drawings to a fuel tank FT.

The fuel supply device 100 includes a fuel pipe 110, a filler neck 120, a tank connection member 130, a rubber protector 140, a breather pipe 150, a bracket 160, and a pipe holder 10.

The fuel pipe 110 is formed using a resin pipe having flexibility and functions as a flow path for fuel. In this embodiment, the fuel pipe 110 is made of polyethylene. The fuel pipe 110 may be made of any other resin having oil resistance instead of polyethylene. The filler neck 120 is connected to one end of the fuel pipe 110 and accepts insertion of the fueling gun not shown in the drawings. The tank connection member 130 is welded to the opposite end of the fuel pipe 110 and connects the fuel pipe 110 and the fuel tank FT.

The rubber protector 140 has a hollow cylindrical shape and is configured to be bendable. The rubber protector 140 is attached to an end portion of the fuel pipe 110 adjacent to the tank connection member 130. More specifically, the rubber protector 140 is attached to a range where fuel is likely to be accumulated. The rubber protector 140 has fire resistance and reduces damage of the fuel pipe 110 by melting in case of fire. In this embodiment, the rubber protector 140 is made of ethylene-propylene-diene rubber (EPDM). The rubber protector 140 may be made of any other material having fire resistance such as butyl rubber instead of EPDM.

The breather pipe 150 makes fuel vapor inside the fuel tank FT go back to the filler neck 120 to let internal pressure out of the fuel tank FT. The breather pipe 150 has one end connected to the filler neck 120 and an opposite end connected to the fuel tank FT. The breather pipe 150 is not assumed to be subjected to accumulation of fuel inside the breather pipe 150. Thus, the rubber protector 140 is not attached to the breather pipe 150. The bracket 160 is used for fixing the fuel pipe 110 and the breather pipe 150 to the wheel house inner of a vehicle body not shown in the drawings.

The pipe holder 10 holds a portion of the fuel pipe 110 to which the rubber protector 140 is attached and the breather pipe 150. In this embodiment, the portion of the fuel pipe 110 to which the rubber protector 140 is attached is also called a protection member attached part 111. The pipe holder 10 is fixed to a lateral surface of a side member 200 of a vehicle body. A method of fixing the pipe holder 10 will be described later.

A-2. Detailed Configuration of Pipe Holder

Figure 3:
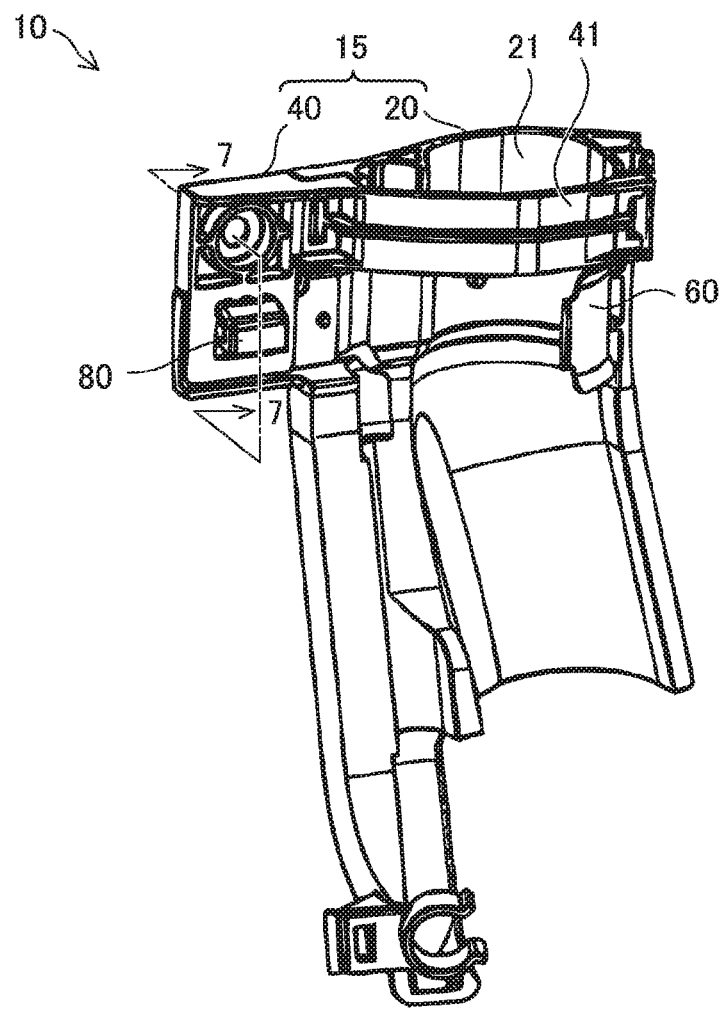
FIG. 3 is a perspective view illustrating the detailed configuration of the pipe holder.

FIG. 3 is a perspective view illustrating the detailed configuration of the pipe holder 10. The pipe holder 10 includes a resin clamp 15 and a metallic member 60. The resin clamp 15 surrounds and holds the protection member attached part 111 of the fuel pipe 110 partially in a peripheral direction. The resin clamp 15 includes a first resin member 20 and a second resin member 40. The pipe holder 10 has a configuration formed by overlaying three members on each other including the first resin member 20, the second resin member 40, and the metallic member 60.

Figure 4:
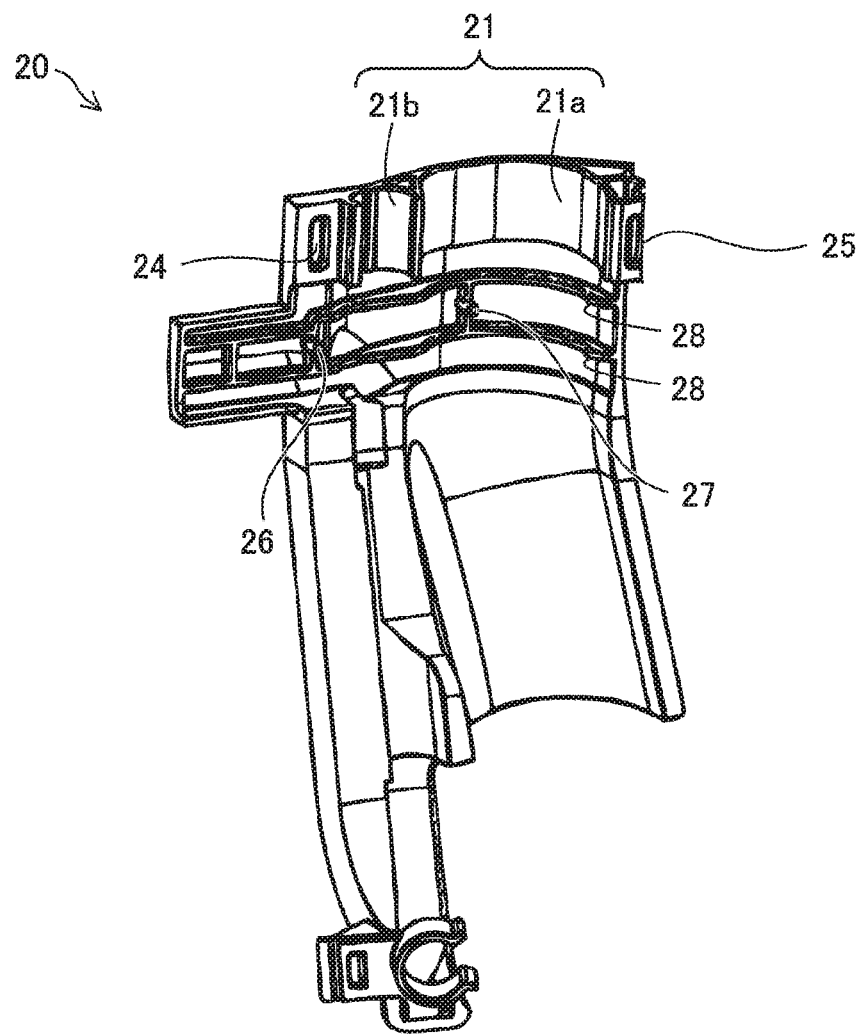
FIG. 4 is a perspective view illustrating the detailed configuration of a first resin member.
Figure 5:
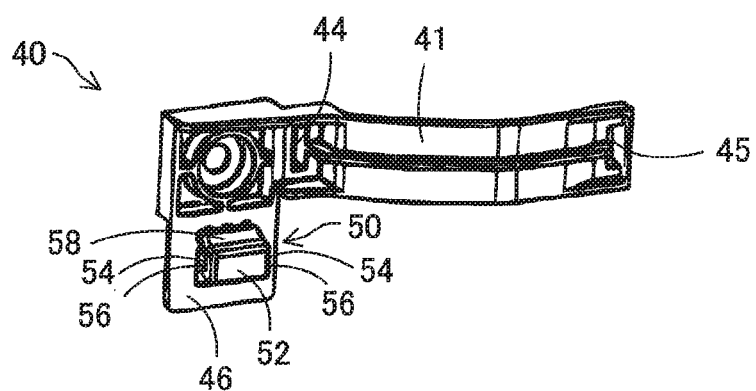
FIG. 5 is a perspective view illustrating the detailed configuration of a second resin member.
Figure 6:
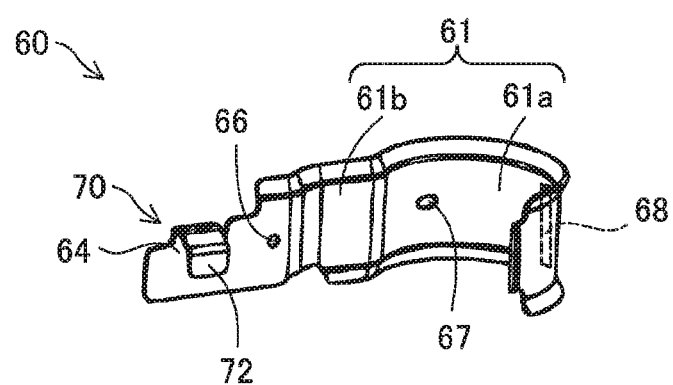
FIG. 6 is a perspective view illustrating the detailed configuration of a metallic member.

FIG. 4 is a perspective view illustrating the detailed configuration of a first resin member 20. FIG. 5 is a perspective view illustrating the detailed configuration of a second resin member 40. FIG. 6 is a perspective view illustrating the detailed configuration of a metallic member 60.

As shown in FIG. 4, the first resin member 20 includes a first clamp part 21 having a semi-cylindrical appearance. As shown in FIG. 3, the first clamp part 21 is arranged to face a second clamp part 41 of the second resin member 40 described later. The first clamp part 21 includes a fueling pipe holder 21a for holding the protection member attached part 111 of the fuel pipe 110, and a breather pipe support 21b for supporting the breather pipe 150. The first resin member 20 has two connection holes 24 and 25 for connection to the second resin member 40. The connection hole 24 is formed at one end portion of the first clamp part 21. The connection hole 25 is formed at the opposite end portion of the first clamp part 21. The first resin member 20 has two positioning protrusions 26 and 27 and two connection pawls 28 for connection to the metallic member 60.

As shown in FIG. 5, the second resin member 40 includes the second clamp part 41 and a resin fixing part 46. The second clamp part 41 has an arc-like appearance. A connection pawl 44 is formed at one end portion of the second clamp part 41. A connection pawl 45 is formed at the opposite end portion of the second clamp part 41. The connection pawls 44 and 45 are connected to the connection holes 24 and 25 respectively. The resin fixing part 46 includes a resin engagement pawl part 50. The resin engagement pawl part 50 is overlaid on a metallic engagement pawl part 70 of the metallic member 60 described later to form an engagement unit 80. The engagement unit 80 is engaged with an engagement opening formed at the lateral surface of the side member 200 of a vehicle body. The resin engagement pawl part 50 includes a first wall part 52, two second wall parts 54, two protrusions 56, and a third wall part 58. The first wall part 52 is formed substantially parallel to the resin fixing part 46 and covers an end portion 72 of the metallic member 60 described later. The two second wall parts 54 are formed at the right and left sides of the first wall part 52 to be substantially vertical to and continuous with the first wall part 52. The two protrusions 56 are arranged at corresponding ones of the second wall parts 54 and protrude in directions in which the protrusions 56 go away from each other. Each of the protrusions 56 has a shape tilted toward the first wall part 52. The third wall part 58 is formed to be continuous with the upper end of the first wall part 52 to connect the resin fixing part 46 and the first wall part 52. The third wall part 58 has a shape tilted downwardly from the resin fixing part 46 toward the first wall part 52.

As shown in FIG. 6, the metallic member 60 includes a metallic clamp part 61 and a metallic fixing part 64. The metallic clamp part 61 has an arc-like shape in a plan view with a portion cut off from a circle. The metallic clamp part 61 has a band-like appearance. The metallic clamp part 61 includes a fueling pipe holder 61a for grasping and holding the protection member attached part 111 of the fuel pipe 110, and a breather pipe support 61b for supporting the breather pipe 150. The metallic fixing part 64 includes a metallic engagement pawl part 70. The metallic engagement pawl part 70 is processed by bending and has the end portion 72 formed substantially parallel to the metallic fixing part 64. The metallic member 60 has two positioning holes 66 and 67 and a connection hole 68 for connection to the first resin member 20. The two positioning holes 66 and 67 are through holes each formed into a substantially circular shape. The connection hole 68 is a through hole having a vertically-long rectangular shape.

In this embodiment, the first resin member 20 and the second resin member 40 are made of polyacetal (POM). The first resin member 20 and the second resin member 40 may be made of any other resin such as polycarbonate or polyimide instead of POM. The metallic member 60 is made of stainless steel formed into a thin plate and has high heat resistance. The metallic member 60 may be made of any other metal such as titanium or copper instead of stainless steel.

The fuel pipe 110 of this embodiment is a concept subordinate to a fueling pipe in "SUMMARY." The rubber protector 140 of this embodiment is a concept subordinate to a protection member in "SUMMARY." The fuel pipe 110 and the rubber protector 140 of this embodiment are concepts subordinate to a pipe member in "SUMMARY."

A-3. Assembly of Pipe Holder

A method of assembling the pipe holder 10 will be described using FIGS. 3 to 6. First, the first resin member 20 and the metallic member 60 are overlaid on each other. The first resin member 20 and the metallic member 60 are overlaid so as to insert the positioning protrusions 26 and 27 into the positioning holes 66 and 67 respectively. Further, the two connection pawls 28 are inserted into the connection hole 68 to connect the first resin member 20 and the metallic member 60. Then, the first resin member 20 to which the metallic member 60 is connected and the second resin member 40 are overlaid on each other so as to catch the fuel pipe 110 therebetween with the rubber protector 140 attached to the fuel pipe 110, thereby forming the resin clamp 15. The connection pawls 44 and 45 are connected to the connection holes 24 and 25 respectively. The metallic engagement pawl part 70 and the resin engagement pawl part 50 are overlaid on each other in a direction in which the first clamp part 21 and the second clamp part 41 face each other, thereby forming the engagement unit 80. By doing so, the metallic engagement pawl part 70 is covered by the resin engagement pawl part 50. Further, the metallic fixing part 64 is covered by the resin fixing part 46.

As shown in FIG. 2, the pipe holder 10 holds the protection member attached part 111 of the fuel pipe 110 and the breather pipe 150. This holding may be achieved as follows, for example. First, the first resin member 20 and the metallic member 60 are connected by the foregoing method. Next, the fuel pipe 110 to which the rubber protector 140 is attached in advance is placed so as to contact the fueling pipe holders 21a and 61a. Further, the breather pipe 150 is placed so as to contact the breather pipe supports 21b and 61b. Then, the first resin member 20 and the second resin member 40 are connected. By doing so, the first clamp part 21 and the second clamp part 41 are caused to face each other across the protection member attached part 111 of the fuel pipe 110 to surround and hold the protection member attached part 111 of the fuel pipe 110 in the peripheral direction. The metallic clamp part 61 of the metallic member 60 grasps and holds the protection member attached part 111 of the fuel pipe 110 in a partial range in the peripheral direction. This allows a residual portion of the rubber protector 140 in the peripheral direction attached to the outer periphery of the fuel pipe 110 to protrude radially outwardly from a place not covered by the metallic clamp part 61. As a result, by adjusting a range where the fuel pipe 110 is surrounded by the metallic clamp part 61, the residual portion of the rubber protector 140 to protrude radially outwardly becomes controllable in terms of position or direction. The first clamp part 21 of the first resin member 20 is located radially outwardly of the fuel pipe 110 from the metallic clamp part 61 of the metallic member 60.

A-4. Assembly of Pipe Holder into Vehicle Body

Figure 7:
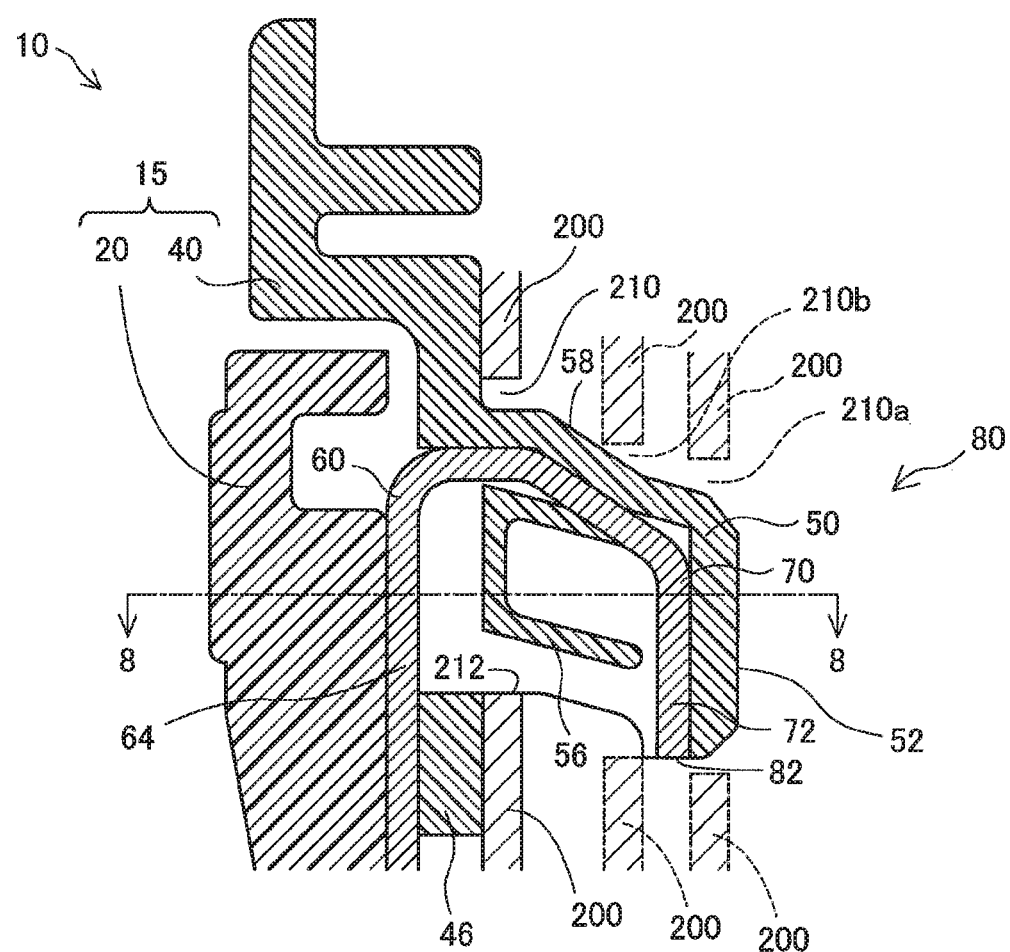
FIG. 7 is a sectional view illustrating a cross section taken along a line 7-7 in FIG. 3.

FIG. 7 is a sectional view illustrating a cross section taken along a line 7-7 in FIG. 3. The engagement unit 80 is inserted into an engagement opening 210 formed at the lateral surface of the side member 200 of a vehicle body to engage the engagement unit 80 and the engagement opening 210, thereby assembling the pipe holder 10 into the vehicle body. The engagement opening 210 is a through hole having a rectangular appearance, for example. For the convenience of illustration, FIG. 7 shows the cross section of the pipe holder 10 and the cross section of the side member 200 near the engagement opening 210. FIG. 7 shows the position of an engagement opening 210a at the start of insertion of the engagement unit 80 indicated by a dashed line and the position of an engagement opening 210b during insertion of the engagement unit 80 indicated by a dashed line.

First, the pipe holder 10 assembled in advance to hold the protection member attached part 111 of the fuel pipe 110 and the breather pipe 150 is prepared at a position at which the engagement unit 80 and the engagement opening 210 face each other. Then, the engagement unit 80 is inserted into the engagement opening 210 with the first wall part 52 at the front. The first wall part 52 is formed into a size slightly smaller than the engagement opening 210. Thus, an edge of the engagement unit 80 and an edge of the engagement opening 210 (210a) are unlikely to collide with each other at the start of insertion. This allows reduction in workability deterioration and reduces the occurrence of damage on each member. The third wall part 58 of the resin engagement pawl part 50 has a shape tilted toward the first wall part 52 to reduce the occurrence of collision between the edge of the engagement unit 80 and the edge of the engagement opening 210 (210b) during the insertion. This allows reduction in workability deterioration and reduces the occurrence of damage on each member. When the insertion is completed to engage the engagement unit 80 and the engagement opening 210, the resin fixing part 46 is placed in a state abutting on the lateral surface of the side member 200.

Figure 8:
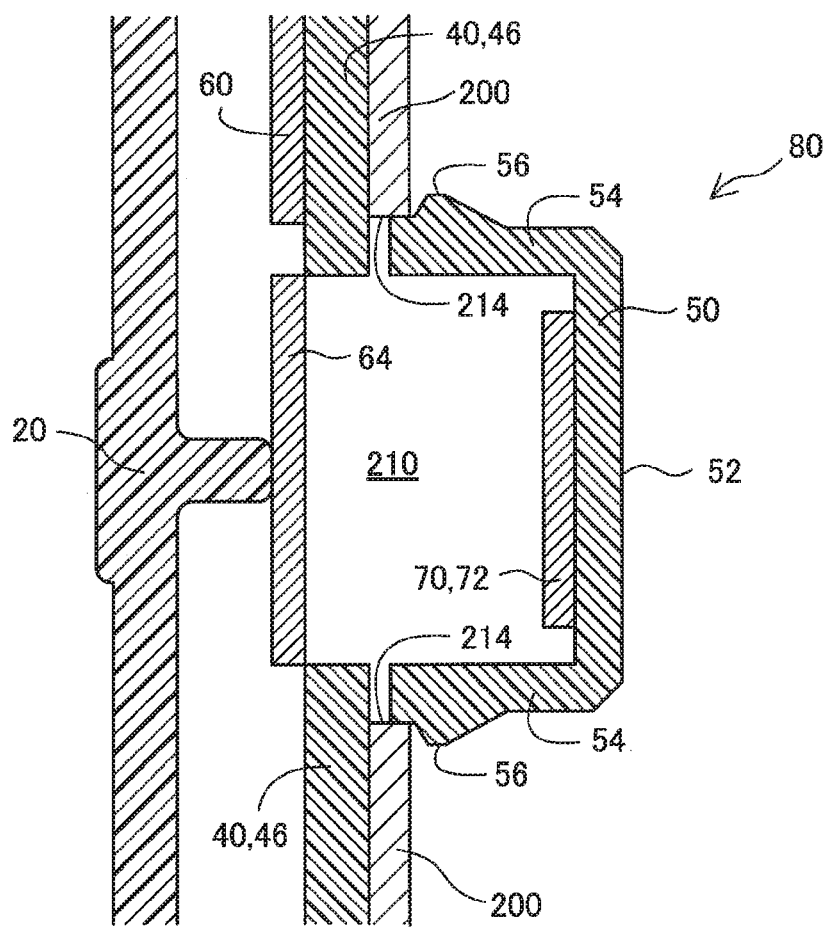
FIG. 8 is a sectional view illustrating a cross section taken along a line 8-8 in FIG. 7.

FIG. 8 is a sectional view illustrating a cross section taken along a line 8-8 in FIG. 7. FIG. 8 shows a state where the engagement unit 80 and the engagement opening 210 are in engagement. The two second wall parts 54 of the resin engagement pawl part 50 are provided with the corresponding protrusions 56 and each protrusion 56 is formed to protrude further than an outer edge 214 of the engagement opening 210. Each protrusion 56 has a shape tilted toward the first wall part 52. Thus, the engagement unit 80 and the engagement opening 210 are easily engaged by what is called snap-fit.

As shown in FIG. 3, the three members including the first resin member 20, the second resin member 40, and the metallic member 60 are overlaid on and fixed to each other. Thus, as shown in FIG. 7, the metallic member 60 is fixed to the resin clamp 15 while the metallic engagement pawl part 70 is covered by the resin engagement pawl part 50 and the metallic fixing part 64 is covered by the resin fixing part 46. This prevents the metallic member 60 from contacting the side member 200 of the vehicle body while the engagement unit 80 and the engagement opening 210 are in engagement. This prevents contact between the metallic engagement pawl part 70 made of metal and the metallic vehicle body to reduce the occurrence of abnormal noise due to contact between metallic members.

A-5. Behavior of Pipe Holder 10 in Case of Fire

The resin clamp 15 is made of resin. Hence, the resin clamp 15 is exposed to the risk of being softened and deformed or melted in case of fire. Thus, in case of fire, the resin engagement pawl part 50, or the first clamp part 21 and the second clamp part 41 are exposed to the risk of burning through. This causes the risk of failing to hold the protection member attached part 111 of the fuel pipe 110 only by the use of the resin clamp 15 in case of fire.

In this regard, as shown in FIG. 7, a lower end 82 viewed in the vertical direction of a portion of the metallic engagement pawl part 70 inserted into the engagement opening 210 is located below a lower end 212 of the engagement opening 210 while the engagement unit 80 and the engagement opening 210 are in engagement. Thus, even if the resin clamp 15 is softened and deformed or melted in case of fire, the high heat resistance of the metallic member 60 allows the metallic member 60 to maintain its shape to make the metallic engagement pawl part 70 get hooked in the engagement opening 210. Additionally, as described above, the metallic clamp part 61 of the metallic member 60 grasps and holds the protection member attached part 111 of the fuel pipe 110 in the peripheral direction. Thus, even if the resin clamp 15 of the pipe holder 10 is burned through so only the metallic member 60 remains in existence in case of fire, the rubber protector 140 is stilled allowed to be fixed to a vehicle body while remaining covering the fuel pipe 110.

In the pipe holder 10 of the embodiment described above, even if the resin clamp 15 is melted, the protection member attached part 111 of the fuel pipe 110 is still held by the metallic member 60 and the metallic engagement pawl part 70 of the metallic member 60 gets hooked in the engagement opening 210 of a vehicle body. This enables fixing of the rubber protector 140 to the vehicle body while the rubber protector 140 remains covering the fuel pipe 110 even in case of fire. Further, by the presence of the configuration in which the engagement unit 80 and the engagement opening 210 are in engagement, the pipe holder 10 is assembled easily into the vehicle body. This eliminates the need to fasten the pipe holder 10 to the lower surface of the vehicle body with a bolt to make it possible to reduce limitation to be imposed on a piping shape for the fuel pipe 110. Additionally, when the engagement unit 80 and the engagement opening 210 are in engagement, preventing contact between the metallic engagement pawl part 70 and the vehicle body suppresses the occurrence of abnormal noise due to such contact.

The metallic engagement pawl part 70 of the metallic member 60 has the end portion 72 inserted into the engagement opening 210 when the engagement unit 80 and the engagement opening 210 are in engagement and formed along a direction that is across an insertion direction in which the engagement unit 80 is inserted into the engagement opening 210. This enables tight engagement between the metallic engagement pawl part 70 and the engagement opening 210 if the resin clamp 15 is melted in case of fire. This enables a simplified and compact configuration of the metallic engagement pawl part 70 to make it possible to reduce size increase and manufacturing cost increase of the pipe holder 10. Further, the metallic clamp part 61 surrounds the fuel pipe 110 to which the rubber protector 140 is attached in a range less than the range of the entire periphery of the fuel pipe 110. This enables a residual portion of the rubber protector 140 in the peripheral direction attached to the outer periphery of the fuel pipe 110 to protrude radially outwardly from a place not covered by the metallic clamp part 61. As a result, by adjusting a range where the fuel pipe 110 is surrounded by the metallic clamp part 61, the residual portion of the rubber protector 140 to protrude radially outwardly becomes controllable in terms of position or direction. Thus, this accordingly suppresses loose fit of the rubber protector 140 and deterioration of handling of the fuel supply device 100.

The engagement unit 80 and the engagement opening 210 are engaged by snap-fit. This simplifies work of assembling the pipe holder 10 into a vehicle body to restrict increase in working processes. Further, the third wall part 58 of the resin engagement pawl part 50 has a shape tilted toward the first wall part 52. This configuration suppresses the collision of the edge of the engagement unit 80 and the edge of the engagement opening 210 when the engagement unit 80 and the engagement opening 210 are made to engage each other. This accordingly suppresses workability deterioration and the occurrence of damage on each member.

B. Modifications

B-1. First Modification

In the pipe holder 10 of the foregoing embodiment, while the engagement unit 80 and the engagement opening 210 are in engagement, the metallic engagement pawl part 70 and the side member 200 of a vehicle body do not contact each other. However, this configuration does not limit the present; disclosure. The metallic engagement pawl part 70 and the side member 200 of the vehicle body may contact each other. This configuration still achieves an effect comparable to the effect achieved by the pipe holder 10 of the embodiment.

B-2. Second Modification

The configuration of the metallic member 60 of the foregoing embodiment is merely an example and is changeable in various ways. The end portion 72 of the metallic engagement pawl part 70 is described as being substantially parallel to and continuous with the metallic fixing part 64. However, the metallic fixing part 64 and the end portion 72 of the metallic engagement pawl part 70 are not always required to be substantially parallel. For example, the metallic engagement pawl part 70 may be configured to be simply tilted vertically downwardly from the metallic fixing part 64. Alternatively, the metallic clamp part 61 may surround the protection member attached part 111 to cover the entire periphery of the protection member attached part 111. This configuration still achieves an effect comparable to the effect achieved by the pipe holder 10 of the embodiment.

B-3. Third Modification

The configuration of the resin engagement pawl part 50 of the foregoing embodiment is merely an example and is changeable in various ways. For example, the first wall part 52 may cover the end portion 72 partially. Alternatively, the first wall part 52 may be omitted. Further, either the second wall part 54 or the third wall part 58 may be omitted. The protrusion 56 is not always required to be formed at the second wall part 54 but may be formed at a different part such as the third wall part 58, for example. The shape of the protrusion 56 is not limited to the shape of the foregoing embodiment but the protrusion 56 may have any other shape. In general, the protrusion 56 may protrude further than the outer edge 214 of the engagement opening 210 in the direction crossing the direction in which the engagement unit 80 is inserted into the engagement opening 210. The protrusion 56 may be omitted. In this case, the engagement unit 80 and the engagement opening 210 may be engaged by a fixing method using an adhesive other than snap-fit, for example. This configuration still achieves an effect comparable to the effect achieved by the pipe holder 10 of the embodiment.

B-4. Fourth Modification

In the foregoing embodiment, the pipe holder 10 holds the fuel pipe 110 to which the rubber protector 140 is attached and the breather pipe 150. However, this configuration does not limit the present disclosure. For example, the breather pipe 150 may not be held by the pipe holder 10 and the pipe holder 10 may further hold any other pipe. The rubber protector 140 may cover the entire range of the fuel pipe 110. In general, the pipe holder 10 may hold a pipe member at a vehicle body. The pipe member includes a fueling pipe, and a protection member attached to the fueling pipe and covering the fueling pipe at least partially. This configuration still achieves an effect comparable to the effect achieved by the pipe holder 10 of the embodiment.

B-5. Fifth Modification

In the foregoing embodiment, the engagement opening 210 is provided at the lateral surface of the side member 200 of a vehicle body. However, this configuration does not limit the present disclosure. For example, the engagement opening 210 may be provided at any place of the vehicle body. The engagement opening 210 is not limited to a rectangular through hole but may have any shape capable of being engaged with the engagement unit 80. This configuration still allows use of the pipe holder 10 of the embodiment and achieves an effect comparable to the effect achieved by the pipe holder 10 of the embodiment.

The present disclosure is not limited to the above-described embodiment or modifications but is feasible in the form of various configurations within a range not deviating from the substance of the present disclosure. For example, technical features in the embodiment or those in the modifications can be replaced or combined, where appropriate, with the intention of solving some or all of the aforementioned problems or achieving some or all of the aforementioned effects. Unless being described as absolute necessities in this specification, these technical features may be deleted, where appropriate. For example, the present disclosure may be achieved as the following aspect.

According to one aspect of the present disclosure, there is provided a pipe holder. The pipe holder is for holding a pipe member at a vehicle body. The pipe member includes a fueling pipe and a protection member, the protection member being attached to the fueling pipe and covering the fueling pipe at least partially. The pipe holder comprises: a metallic member including a metallic clamp part that grasps and holds a portion of the fueling pipe at least partially to which the protection member is attached, and a metallic fixing part formed to be continuous with the metallic clamp part and provided with a metallic engagement pawl part; and a resin clamp that surrounds and holds the fueling pipe in the peripheral direction of the fueling pipe with the fueling pipe being grasped by the metallic member, wherein the resin clamp comprises: a first resin member including a first clamp part located radially outwardly of the fueling pipe from the metallic member and contacting the metallic member; and a second resin member including a second clamp part that faces the first clamp part across the fueling pipe and surrounds the portion of the fueling pipe partially in the peripheral direction to which the protection member is attached, and a resin fixing part formed to be continuous with the second clamp part and provided with a resin engagement pawl part, the metallic engagement pawl part and the resin engagement pawl part are overlaid on each other to form an engagement unit, the engagement unit is inserted into an engagement opening formed at the vehicle body to be engaged with the engagement opening, and when the engagement unit and the engagement opening are in engagement, a vertical lower end of a portion of the metallic engagement pawl part inserted into the engagement opening is located below a lower end of the engagement opening. The pipe holder of this aspect comprises the metallic clamp part that grasps and holds the portion of the fueling pipe to which the protection member is attached. When the engagement unit and the engagement opening are in engagement, the lower end viewed in the vertical direction of the portion of the metallic engagement pawl part inserted into the engagement opening is located below the lower end of the engagement opening. Thus, even if the resin clamp is melted in case of fire, the protection member covering the fueling pipe is still held by the metallic member and the metallic engagement pawl part gets hooked in the engagement opening of the vehicle body. This enables fixing of the protection member to the vehicle body while the protection member remains covering the fueling pipe. Further, as the engagement unit and the engagement opening are in engagement, the need of fastening to the lower surface of the vehicle body with a bolt is eliminated to make it possible to reduce limitation to be imposed on a piping shape for the fueling pipe.

In the pipe holder of the above aspect, when the engagement unit and the engagement opening are in engagement, the metallic engagement pawl part may be in a non-contact state with the vehicle body. In the pipe holder of this aspect, when the engagement unit and the engagement opening are in engagement, the metallic engagement pawl part made of metal and the vehicle body do not contact each other. This configuration suppresses the occurrence of abnormal noise due to such contact.

In the pipe holder of the above-aspect, the metallic engagement pawl part may have an end portion inserted into the engagement opening when the engagement unit and the engagement opening are in engagement and formed along a direction that is across an insertion direction in which the engagement unit is inserted into the engagement opening. The pipe holder of this aspect comprises the end portion inserted into the engagement opening and formed along a direction that is across an insertion direction. This configuration enables tight engagement between the metallic engagement pawl part and the engagement opening on the occurrence of melting of the resin clamp in case of fire.

In the pipe holder of the above aspect, the resin engagement pawl part may include: a first wall part covering the end portion at least partially; a second wall part that is substantially vertical to the first wall part and continuous with the first wall part; and a protrusion arranged at the second wall part and protruding further than an outer edge of the engagement opening in the direction crossing the insertion direction when the engagement unit and the engagement opening are in engagement. In the pipe holder of this aspect, the presence of the protrusion protruding further than the outer edge of the engagement opening at the resin engagement pawl part enables engagement between the engagement unit and the engagement opening easily by snap-fit. This simplifies work of assembling the pipe holder into the vehicle body.

In the pipe holder of the above aspect, the resin engagement pawl part may include: a first wall part covering the end portion at least partially; and a third wall part; formed between the resin fixing part and the upper end of the first wall part to be continuous with the resin fixing part and the upper end, and to be tilted from the resin fixing part toward the first wall part. In the pipe holder of this aspect, the resin engagement pawl part includes the third wall part tilted from the resin fixing part toward the first wall part. This configuration suppresses the collision of the edge of the engagement unit and the edge of the engagement opening when the engagement unit and the engagement opening are made to engage each other. This accordingly suppresses workability deterioration and the occurrence of damage on each member.

In the pipe holder of the above aspect, the metallic clamp part may surround the fueling pipe in a partial range in the peripheral direction. In the pipe holder of this aspect, the metallic clamp part surrounds the fueling pipe in a range less than the range of the entire periphery of the fueling pipe. This enables a residual portion of the protection member in the peripheral direction attached to the outer periphery of the fueling pipe to protrude radially outwardly from a place not covered by the metallic clamp part. As a result, by adjusting a range where the fueling pipe is surrounded by the metallic clamp part, the residual portion of the protection member to protrude radially outwardly becomes controllable in terms of position or direction. Thus, this accordingly suppresses loose fit of the protection member and deterioration of handling of the fuel supply device.

The present disclosure is feasible in various aspects. For example, the present disclosure is feasible as a vehicle including a pipe holder, a method of manufacturing the pipe holder, or a protection structure for a fueling pipe.

What is claimed is:

1. A pipe holder for holding a pipe member at a vehicle body, the pipe member including a fueling pipe and a protection member, the protection member being attached to the fueling pipe and covering the fueling pipe at least partially, the pipe holder comprising:
- a metallic member including a metallic clamp part that grasps and holds at least a partial portion of the fueling pipe to which the protection member is attached, and a metallic fixing part formed to be continuous with the metallic clamp part and provided with a metallic engagement pawl part; and
- a resin clamp that surrounds and holds a periphery of the fueling pipe in a peripheral direction of the fueling pipe with the fueling pipe being grasped by the metallic member, wherein the resin clamp comprises:
- a first resin member including a first clamp part located radially outwardly of the fueling pipe from the metallic member and contacting the metallic member; and
- a second resin member including a second clamp part that faces the first clamp part across the fueling pipe and surrounds a first partial part of the periphery of the fueling pipe in the peripheral direction at a point where the protection member is attached, and a resin fixing part formed to be continuous with the second clamp part and provided with a resin engagement pawl part, the metallic engagement pawl part and the resin engagement pawl part are overlaid on each other to form an engagement unit, the engagement unit is inserted into an engagement opening formed at the vehicle body to be engaged with the engagement opening, and when the engagement unit and the engagement opening are in engagement, a vertical lower side of a portion of the metallic engagement pawl part inserted into the engagement opening is located below a lower end of the engagement opening.

2. The pipe holder according to claim 1, wherein
when the engagement unit and the engagement opening are in engagement, the metallic engagement pawl part is in a non-contact state with the vehicle body.

3. The pipe holder according to claim 1, wherein
the metallic engagement pawl part has an end portion inserted into the engagement opening when the engagement unit and the engagement opening are in engagement and formed along a direction that is across an insertion direction in which the engagement unit is inserted into the engagement opening.

4. The pipe holder according to claim 3, wherein
the resin engagement pawl part includes:
- a first wall part covering the end portion at least partially;
- a second wall part that is substantially vertical to the first wall part and continuous with the first wall part; and
- a protrusion arranged at the second wall part and protruding further than an outer edge of the engagement opening in the direction crossing the insertion direction when the engagement unit and the engagement opening are in engagement.

5. The pipe holder according to claim 3, wherein
the resin engagement pawl part includes:
- a first wall part covering the end portion at least partially; and
- a third wall part formed between the resin fixing part and the upper end of the first wall part to be continuous with the resin fixing part and the upper end, and to be tilted from the resin fixing part toward the first wall part.

6. The pipe holder according to claim 1, wherein
the metallic clamp part surrounds a second partial part of the periphery of the fueling pipe in the peripheral direction.

* * * * *